United States Patent [19]

Härle

[11] Patent Number: 5,735,658
[45] Date of Patent: *Apr. 7, 1998

[54] THREAD FORMING TOOL

[76] Inventor: Anton Härle, Drechslerweg 40, D-48161 Münster, Germany

[*] Notice: The term of this patent shall not extend beyond the expiration date of Pat. No. 5,544,993.

[21] Appl. No.: 661,290

[22] Filed: Jun. 10, 1996

Related U.S. Application Data

[63] Continuation-in-part of Ser. No. 349,715, Dec. 5, 1994, Pat. No. 5,544,993.

[30] Foreign Application Priority Data

Dec. 13, 1993 [DE] Germany .......... 43 42 415.5

[51] Int. Cl.⁶ .......... B23B 51/00; B21D 17/02; F16B 35/04
[52] U.S. Cl. .......... 411/414; 411/178; 411/436; 408/229; 72/414
[58] Field of Search .......... 411/178, 411, 411/414, 423, 436; 408/227, 229, 230; 72/414, 470, 476

[56] References Cited

U.S. PATENT DOCUMENTS

| | | | |
|---|---|---|---|
| 4,040,327 | 8/1977 | Otaki | 85/46 |
| 4,764,067 | 8/1988 | Kawashima | 411/310 |
| 4,799,844 | 1/1989 | Chuang | 411/414 |
| 5,056,611 | 10/1991 | Yousef et al. | 411/414 X |
| 5,060,740 | 10/1991 | Yousef et al. | 411/414 X |

FOREIGN PATENT DOCUMENTS 3207975  9/1983  Germany .

OTHER PUBLICATIONS

"Maschinenmarkt" (Oct. 25, 1988).
"Kunststoffberater" (Jun. 1983) article by J. Onasch.
"Maschinenmarkt" (1985) article by P. Dietz et al.
"Konstruktion" (1986) article by M. Weck et al.

*Primary Examiner*—Neill R. Wilson
*Attorney, Agent, or Firm*—Peter K. Kontler

[57] ABSTRACT

A tool having a profile for the forming or shaping of a complementary thread in and/or on a fastener which can be utilized with advantage as a bone screw or another osteosynthetic force transmitting member, instrument or accessory. The thread which is formed by the profile of the tool has two flanks each having a first section adjacent the crest and a second section adjacent the root of the thread. The second sections jointly include or consist of at least four concave portions having different radii of curvature and gradually merging into each other. The first sections make angles of less than 40° with a plane which is normal to the longitudinal axis of the thread. The first and second sections of each flank are separated from each other by an imaginary cylinder having a diameter which matches the pitch diameter of the thread and a longitudinal axis which coincides with or is at least close to the longitudinal axis of the thread.

31 Claims, 4 Drawing Sheets

THREAD FORMING TOOL

CROSS REFERENCE TO RELATED CASE

This is a continuation-in-part of the patent application Ser. No. 08/349,715 filed Dec. 5, 1994 for "Threaded Fastener", now U.S. Pat. No. 5,544,993 granted Aug. 13, 1996.

BACKGROUND OF THE INVENTION

The invention relates to fasteners and fastener making tools in general, and more particularly to improvements in tools for the making of threaded fasteners. Still more particularly, the invention relates to improvements in tools for forming external and/or internal threads on or in fasteners which can be utilized with advantage as osteosynthetic force transmitting members, osteosynthetic accessories and/or for many other purposes.

A standard fastener which is to take up unchanging tensional stresses and/or dynamic stresses (namely tensional stresses of varying magnitude) and which is provided with a standard internal and/or external thread (e.g., an ISO metric screw thread) will be capable of withstanding such stresses only if the magnitude of applied unchanging tensional stresses does not exceed a certain limit and only when the magnitude of dynamic stresses varies within a relatively narrow range. Such fasteners can constitute form-locking screws, bolts, pins, inserts, tubes and many others including so-called tapping screws which are intended to be driven into a part consisting of a material which can yield in response to the penetration of a threaded shank or the like so that the external thread establishes in the part a complementary internal thread.

Important factors which determine the ability of threaded fasteners (such as screws and/or bolts of all kinds, threaded pins or posts, threaded inserts and/or internally and/or externally threaded tubular members) to withstand unchanging and/or variable tensional and other stresses are the dimensions and the configuration of external and/or internal threads. For example, the exact configuration of flanks which extend between the roots and the crests of internal or external threads will exert a great influence upon the ability of threaded fasteners to withstand constant (unchanging) and/or varying tensional stresses. This holds true regardless of whether the dynamic stresses vary gradually or at a relatively high frequency. It is particularly important to properly select the depth of the thread as well as the configuration of those portions of the flanks which are adjacent the root of the thread. Such parameters influence the strength and the useful life of the threaded fasteners.

The depth of the thread is normally selected by taking into consideration the characteristics of the material of the part or parts which are to receive the thread of the fastener, i.e., of the part or parts which are to be brought into mesh with the threaded fastener. The reason is that the strength of a threaded fastener can be caused to vary within a wide range by changing the depth of the thread. Any change of the depth of the thread necessarily entails a change of the minor diameter of the thread of an externally threaded fastener, and such change of the minor diameter can greatly influence the carrying or bearing capacity of the fastener. As a rule, changes of the minimal radius of curvature of the flanks adjacent the root of the thread are inversely proportional to the fatigue strength reduction or fatigue notch factor. Otherwise stated, the fastener is more likely to break in response to unchanging tensional stresses if the radius of curvature of those portions of the flanks which are immediately adjacent the root of the thread is reduced. Therefore, the radius of curvature of those portions of the flank of an ISO metric screw thread which are immediately adjacent the root of the thread cannot be reduced below a minimum value constituting a certain fraction of the pitch of the screw thread. On the other hand, the selection of a relatively large radius of curvature for those portions of the flanks of a thread which are immediately adjacent the root brings about the drawback that the extent of thread overlap is reduced which, in turn, entails the application of increased stresses to the load carrying flank of a thread. Accordingly, the maximum concentration of tensional stresses takes place adjacent the root of the thread, i.e., such maximum stresses are applied to that portion of the stress-bearing flank of a conventional thread which is immediately adjacent the root. A concentration of maximum tensional stresses upon that portion of the stress-bearing flank which is adjacent the root of the thread due to the aforediscussed fatigue notch factor takes place in each region of varying cross-section and is dependent upon the extent of variation of the cross-section.

Accordingly, and if the configuration of those portions of the flanks of a thread which are immediately adjacent the root were to be selected exclusively on the basis of theoretical considerations, the cross-sectional area of the thread immediately adjacent the root should change at a minimal rate. It has been found that such requirements are not met by heretofore known standard threads wherein the configuration of the flanks is determined exclusively on the basis of circular or trigonometric functions.

When the externally threaded part is a screw, a bolt or an analogous fastener, the fastener and its thread are subjected to the action of three different stresses, namely tensional stresses, bending or flexing stresses and rotational or shearing stresses. Shearing stresses will develop primarily while an externally threaded fastener is being driven home (tightened) and also while an externally threaded fastener is being loosened. In spite of the relative shortness of intervals during which an externally threaded fastener is subjected to shearing stresses, such stresses still exert considerable influence upon the ability of the fastener to stand all forces when in actual use. When a tapping screw which is not provided with a core removing hole is being driven into the material of a part which is to be provided with a complementary internal thread, the major part of the resistance which is offered to penetration of the tapping screw into such material is caused by the shank of the tapping screw, i.e., the shank which is in the process of penetrating into the material of a part to be provided with a tapped bore must displace the material which is in the way of the tip of the shank. As a rule, the extent of work which is to be performed by a tapping screw during penetration of its shank into the material of a plate, another osteosynthetic accessory or the like is directly proportional to the cross-sectional area of the central (unthreaded) portion of the shank. Thus, if the resistance of the material to penetration of the shank is to be reduced, the core diameter of the shank must be reduced accordingly. This results in pronounced concentration of stresses at the root, i.e., in the regions of the radially innermost sections of the flanks. This will be readily appreciated by bearing in mind that the material to be displaced resists the advancement of the thread (namely of its flanks), i.e., this also involves a certain amount of work which is necessary to displace the material around the shank of the advancing tapping screw. Such concentration of stresses at the root of the external thread on a tapping tool can be reduced by resorting to harmonic variation of the cross-sectional area at the root and/or by reducing the extent of so-called moulding work of the thread. The just mentioned reductions can be achieved by appropriate shaping of the flanks not only within but also outside of the pitch diameter. As used herein, the term pitch diameter is intended to denote the diameter of an imaginary cylinder whose longitudinal axis coincides with the axis of the thread and which would cut the thread at a height where the width of the thread and of the helical groove between the flanks would be equal. Reference may be had, for example, to pages 1537–1538 of McGraw Hill "*Concise Encyclopedia of Science and Technology*" (1984 Edition).

When a tapping or thread cutting tool or fastener is driven into a ductile plastic material, the advancing tip of the shank initiates a material flow in a direction toward the groove of the thread and more specifically toward the root. The resistance which the plastic material offers to penetration of the tip of the shank of an externally threaded tapping tool will decrease if the profiles of the flanks on the thread of the shank offer relatively low resistance to the flow of displaced plastic material into the helical groove and toward the root of the thread. Based on presently known ductility of plastic materials, the displaced ductile material is bounded by a rounded surface. Therefore, flanks having substantially flat or straight outlines are more likely to oppose the flow of displaced plastic material toward the root of a tapping screw or an analogous thread forming tool than harmonically concave flanks which enable the external thread to act not unlike a plowshare and to thus direct the displaced plastic material into the groove and toward the root of the external thread.

The stress upon an externally threaded screw or bolt or a like fastener is further dependent on the ability of the complementary (internal) thread of the part (e.g., a plate) into which the fastener is driven to resist shearing stresses. The connection between the externally threaded member and an internally threaded part is more satisfactory if the internal thread fills or at least substantially fills the helical groove of the externally threaded member. In other words, by properly selecting the surfaces (flanks) which bound the helical groove of an externally threaded member, one can increase the extent to which the helical groove of the externally threaded member is filled with the material of the internally threaded part. An ideal situation will develop if the internal thread completely fills the helical groove of the externally threaded member and if the externally threaded member cooperates with the internally threaded part to develop radial stresses; this ensures that, when the externally threaded member is subjected to axial or longitudinal stresses, the internal thread which completely or practically completely fills the helical groove of the externally threaded member offers a pronounced resistance to longitudinal displacement of the externally threaded member. In other words, the extent to which the externally threaded member resists axial stresses is not dependent solely upon the pitch diameter of the externally threaded member because such resistance is assisted by the internal thread of the part which mates with the externally threaded member. Still further, such resistance of the externally threaded member to axial stresses is enhanced by radial forces which are generated by the flanks of at least one of the mating internal and external threads. Consequently, the configuration of the radially outer sections of flanks bounding the external thread of a screw or a like member also influence the desirable characteristics of such member. The configuration of the radially outer sections of the external thread (namely the sections which are adjacent the crest of the external thread) will influence the ability of the externally threaded member to withstand shearing stresses.

German patent application Ser. No. 32 07 975 A1 filed by Richard Bergner GmbH & Co. (published Sept. 15, 1983) discloses a thread cutting screw which is to be driven into plastic materials and wherein those portions of the flanks which are immediately adjacent the root are parallel to the axis of the screw and the neighboring sections of the flanks have constant radii of curvature all the way to the radially outermost sections which extend radially outwardly to the crest of the thread and the cross-sections of which in a plane including the longitudinal axis of the thread are straight lines. Accordingly, each of those sections of the flanges which are located within the aforementioned imaginary cylinder, the diameter of which matches the pitch diameter of the thread, includes two parts, namely a radially inner part having an infinitely large radius of curvature and a radially outer part the cross-section of which in a plane including the axis of the thread constitutes a portion of a circle, i.e., a curve having a constant radius of curvature.

U.S. Pat. No. 4,799,844 granted Jan. 24, 1989 to Chuang for "Elliptical Thread Design" discloses a screw structure with a root portion extending between adjacent thread turns and having a curvature defined by a portion of an ellipse for providing improved stress reduction during periods of severe loading. The patented screw structure is designed primarily to take up compressive stresses and to form part of a down hole percussion drilling tool. The flank angle of the thread on the drilling tool of Chuang is greater than 45°. The configuration of the thread on the patented drilling tool is selected for the specific purpose of withstanding compressive stresses and is not satisfactory when a threaded member or part is to resist pronounced (constant and/or dynamic) tensional stresses. The patentee considers it advisable to avoid the provision of flanks having large radii of curvature adjacent the root of the thread.

U.S. Pat. No. 4,040,327 granted Aug. 9, 1977 to Otaki for "High Fatigue Screw Threads" discloses a symmetric screw thread system with a flank angle of 70°±2° and with flank sections which are parallel with the axis in the region adjacent to the root of the thread. Such threads are incapable of standing pronounced tensional and/or dynamic stresses. The transition zones between the axially parallel radially inner sections and the outer sections of the flanks have extremely small radii of curvature.

Applicant is further aware of an article on page 48 of the German-language publication entitled "*Maschinenmarkt*" (dated Oct. 25, 1988) which discusses a tool for non-cutting shaping (molding) of threads in hard metallic materials. Pages 31 to 34 of the German-language publication entitled "*Kunststoffberater*" (published in June 1983) contain an article by Jürgen Onasch which discusses a universal thread for a sheet metal screw. The article by P. Dietz and J. Blechschmidt on pages 836–838 of the German-language publication entitled "*Maschinenmarkt*" (published in 1985) discusses the influence of configuration of the thread upon the ability of the threaded part to withstand stresses. The article proposes to increase the flank angle in order to enhance the distribution of stresses. Pages 213 to 218 of the German-language publication entitled "*Konstruktion*" (published in 1986) contain an article by M. Weck and F. F örtsch which discusses a computerized process for shaping screw threads.

OBJECTS OF THE INVENTION

An object of the invention is to provide a tool capable of forming or shaping a novel and improved thread which enables the member or part having such thread to stand pronounced constant and/or variable tensional stresses.

Another object of the invention is to provide a tool which can form a thread having novel and improved flanks.

A further object of the invention is to provide a tool capable of forming a thread having a configuration which renders it possible to reduce the resistance which a ductile material offers to penetration of the threaded part.

An additional object of the invention is to provide a tool for forming a thread with flanks which are configurated in such a way that the concentration of stresses at the root of the thread is eliminated or reduced to an acceptable value.

Still another object of the invention is to provide a novel and improved externally or internally profiled (e.g., threaded) member.

A further object of the invention is to provide a tool for forming a thread which can be applied with particular advantage to osteosynthetic fasteners and/or accessories.

Another object of the invention is to provide a tool with an external and/or internal profile (e.g., a thread) having flanks which radically depart from the flanks of heretofore known profiles.

An additional object of the invention is to improve the configuration of flanks adjacent the crest and/or the root of a screw thread.

A further object of the invention is to provide a novel and improved set or array of curved portions constituting selected sections of flanks on the above outlined profile.

Another object of the invention is to provide a tool or accessory having a profile which exhibits the aforediscussed advantages and can be mass-produced in available machines.

An additional object of the invention is to provide a novel and improved method of making and shaping internal and/or external threads.

SUMMARY OF THE INVENTION

The invention is embodied in a tool which has a thread forming profile designed to form or shape a thread on a fastener for tensional and dynamic (such as varying tensional) stressing. The thread which can be formed by the improved tool has two flanks each extending between the root and the crest of the thread and each having a first section disposed between the crest and an imaginary cylinder having a diameter which matches the pitch diameter of the thread and an axis which coincides with or is at least close to the longitudinal axis of the thread. Each first section makes an angle of less than 40° with a plane which is normal to the longitudinal axis of the thread, and each flank further comprises an at least partially arcuate second section disposed between the root and the imaginary cylinder. The second sections jointly include at least four portions having different radii of curvature. It is presently preferred to configurate the second sections in such a way that they jointly include or comprise at least five portions having different radii of curvature.

That portion of at least one of the second sections which is adjacent the root of the thread formed by the profile of the improved tool can have a radius of curvature greater than 0.25 h (preferably greater than 0.5 h) wherein h is the pitch of the thread which is to be formed by the tool.

A cross-section of at least one of the first and second sections (of the flanges of the thread formed by the improved profile) in a plane including the longitudinal axis of the thread is or can be a curve having an infinite number of neighboring concave portions each of which has a different radius of curvature and each of which merges gradually into the neighboring concave portion or portions.

That portion of at least one of the second sections which is adjacent the root of the thread can have an infinitely large radius of curvature. The cross-section of such portion of the at least one second section in the aforementioned plane including the longitudinal axis of the thread is or can be at least substantially parallel to the longitudinal axis.

The cross-sections of the at least four portions forming part of the second sections in the aforementioned plane including the longitudinal axis of the thread can constitute curves, and imaginary tangents applied to such curves can enclose with the longitudinal axis of the thread acute angles which increase in a direction from the root toward the respective first section. The aforementioned tangents contact the respective curves at points which are disposed a different axial distances from the root.

The portions of at least one of the second sections of the flanks of the thread formed by the improved profile can be said to comprise a series of successive portions including a first portion at the root of the thread and a last portion at the respective first section. The radii of curvature of such successive portions of the at least one second section preferably increase in a direction from the respective first section toward the root of the thread. The cross-sections of the aforementioned series of successive portions in the plane including the longitudinal axis of the thread can be configurated in such a way that they together form a curve, and the inclination of imaginary tangents contacting the curve at successive portions of the at least one second section relative to the longitudinal axis of the thread preferably increases in a direction from the first portion toward the last portion of the series. The inclination of the imaginary tangents can be between 0° and approximately 85°.

The cross-section of at least one portion of at least one of the sections (particularly the second sections) in the plane including the longitudinal axis of the thread formed by the improved profile can constitute a higher-degree curve. Such curve can resemble or constitute an intersection of a plane with a cone of revolution. For example, the curve can constitute a portion of at least one ellipse. The value of a/b (wherein a is the major axis and b is the minor axis of the at least one ellipse) can be between about 1.5 and 15, for example, approximately 3.

It is possible to select the configuration of at least one of the flanks in such a way that a cross-section of at least one of the first and second sections, in a plane including the longitudinal axis of the thread is a curve satisfying the equation $y = x^n$ wherein n is a constant between 1.5 and 5, preferably at least close to 3.

One of the second sections can have a first configuration, and the other second section can have a different second configuration. Analogously, one of the first sections can have a first configuration and the other first section can have a different second configuration.

The cross-section of at least one of the first sections in the aforementioned plane including the longitudinal axis of the thread can comprise at least one concave portion. The at least one concave portion of such first section is preferably adjacent the crest of the thread, and an imaginary tangent to such at least one concave portion can make an angle of less than 71° with a plane which is normal to the longitudinal axis of the thread.

The cross-section of at least one of the first sections in the plane including the longitudinal axis of the thread can constitute a concave curve.

The thread of the fastener can constitute an internal thread or an external thread.

The fastener which has a thread formed or shaped by resorting to the profile of the improved tool can constitute or form part of an osteosynthetic connector, instrument or accessory. For example, the fastener can constitute or form part of a screw, a bolt, a nut, an insert or a tubular body.

The fastener can be utilized jointly with a device having a second thread which is configured to mesh with the thread of the fastener, i.e., which is complementary to the thread of the fastener. The device can constitute or form part of the improved tool for shaping or forming the thread of the fastener.

The improved tool can constitute or form part of a tap, a thread rolling implement, a die, a thread milling cutter or any other thread shaping or forming implement.

The novel features which are considered as characteristic of the invention are set forth in particular in the appended claims. The improved thread shaping or forming tool itself, however, both as to its construction and the mode of making and utilizing the same, together with additional features and advantages thereof, will be best understood upon perusal of the following detailed description of certain presently preferred specific embodiments with reference to the accompanying drawings.

DESCRIPTION OF PREFERRED EMBODIMENTS

The matter shown in FIGS. 1 to 5 is identical with that shown and described in the parent application Ser. No. 08/349,715 filed Dec. 5, 1994, now U.S. Pat. No. 5,543,993

Figure 1:
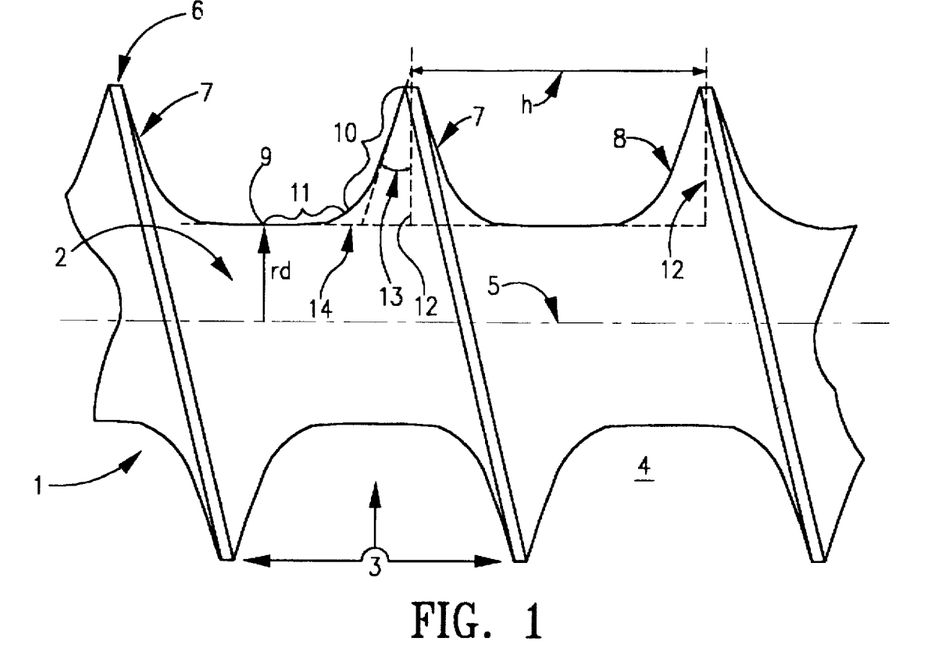
FIG. 1 is an enlarged fragmentary elevational view of a fastener having a thread shaped or formed by a complementary profile (e.g., a thread) of a tool which embodies one form of the invention, such fastener being adapted to be utilized with advantage to penetrate into a plastic material.
Figure 2:
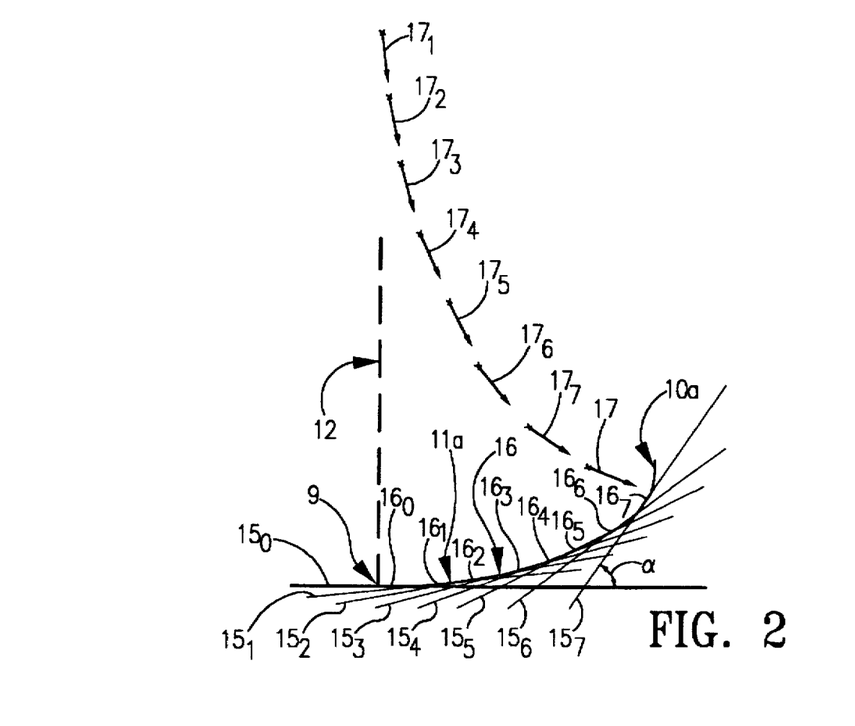
FIG. 2 is an enlarged view of a detail of the second section of one of the flanks on the thread of the fastener shown in FIG. 1.

Referring to FIGS. 1 and 2, there is shown a portion of a threaded fastener 1 having an elongated shank 2 which is provided with an external thread 3 and a helical groove 4. The character 5 denotes the central longitudinal axis of the thread 3. The latter is provided with a crest 6, two flanks 7, 8 and a root 9. Each of the flanks 7, 8 includes a first section 10 remote from and a second section 11 adjacent the root 9. An imaginary tangent contacting the curve 10a corresponding to a cross-section of a section 10 in a plane including the axis 5 of the thread 3 makes an acute angle 13 with a plane 12 which is normal to the axis 5 and intersects the adjacent portion of the helically convoluted crest 6 of the thread.

The illustrated fastener can be utilized with advantage as an insert for penetration of its shank 2 into a ductile plastic material (e.g., a thermoplastic or a pressure setting plastic material). The thread 3 has a pitch h, and an imaginary tangent 14 to the root 9 of the thread 3 is parallel to the axis 5. The radial distance rd between the axis 5 and the root 9 equals one-half of the minor diameter of the thread 3.

The cross-sections of the second sections 11 of the flanks 7 and 8 in a plane including the axis 5 of the thread 3 constitute arcuate concave curves 11a one of which is shown, drawn to a larger scale, in FIG. 2. It will be seen that a plane denoted by the line 12 is normal to the imaginary tangent 14 (i.e., to the axis 5 of the thread 3) and that imaginary tangents $15_o$ to $15_n$ contacting successive portions $16_o$ to $16_n$ of the curve 11a (i.e., successive portions of the illustrated section 11) make with the imaginary tangent 14 angles alpha which increase in a direction from the root 9 toward the respective first section 10 of the corresponding flank (namely the flank 8 of FIG. 2). In FIG. 2, n equals 7 and each of the portions $16_1$ to $16_7$ has a different radius of curvature ($17_1$ to $17_7$). The radii of curvature decrease with the distance of the corresponding portions $16_1$ to $16_7$ of the curve 11a from the root 9, i.e., with increasing axial distance of the portions $16_1$ to $16_7$ from the plane denoted by the line 12 shown in FIG. 2.

FIG. 2 further shows harmonious (gradual) transitions between neighboring portions $16_1$ to $16_7$ of the curve 11a denoting the cross-section of one of the second sections 11 in the plane of FIGS. 1 and 2, i.e., in a plane which includes the axis 5 of the thread 3. This, coupled with the aforediscussed increase of the angle alpha in a direction axially and away from the location of the root 9, contributes to a pronounced reduction of the so-called notch stress which develops at locations close to the root of a conventional thread. A tangent to that portion of the curve 11a of FIG. 2 which coincides with the root 9 also coincides with the tangent 14, i.e., with a line which is parallel to the axis 5 of the thread 3. Thus, the radius of curvature of that portion of the curve 11a which coincides with the root 9 shown in FIGS. 1 and 2 is disposed at an infinite distance from the tangent 14.

The total number of curve portions 16 forming part of the two sections 11 can be reduced to not less than four or increased to a number even larger than twice that shown in FIG. 2. It is presently preferred to select the curvature of the sections 11 in such a way that they jointly include at least five portions having different radii of curvature. For example, at least one of the curves 11a can have an infinite number of successive portions having different radii of curvature including a first portion at the root 9 and a last portion merging into the adjacent radially inner portion of a curve (10a) denoting the cross-section of the respective first section in the plane of FIGS. 1 and 2. It can be said that the length of the radii of curvature (such as the radii $17_1$ to $17_7$ shown in FIG. 2) is inversely proportional to the distance of the respective portions of a section 11 from the root 9. The character 10a denotes in FIG. 2 a cross-section of that portion of one of the first sections 10 which is immediately adjacent and merges gradually into the portion 16₇ of the curve 11a.

The sections 11 are located within and the sections 10 are located outside of an imaginary cylinder whose axis coincides with, or is at least close to, the axis 5 and whose diameter equals the pitch diameter of the thread 3.

The angle 13 between that portion of a section 10 which is adjacent the crest 6 and the line denoting the plane 12 is at least 40° and can be considerably less than 40°. The maximum radius of curvature of the curve 11a of FIG. 2 is or can be greater than 0.25 h (wherein h is the pitch of the thread 3). It is presently preferred to select a maximum radius of curvature not less than 0.5 h. The angle alpha shown in FIG. 2 can vary between 0° and approximately 85°.

The fastener has been found to be capable of withstanding constant as well as dynamic (varying) tensional stresses much more readily than heretofore known fasteners. Such greater resistance to constant and/or dynamic tensional stresses is believed to be attributable to the feature that the angle 13 between an imaginary tangent to the radially outermost portion of a section 10 and the plane denoted by the line 12 and passing through the adjacent portion of the crest 6 is less than 40°, and to the aforediscussed selection of radii of curvature 17₀ to 17₇ of at least four portions of the composite section including the two sections 11.

Figure 3:
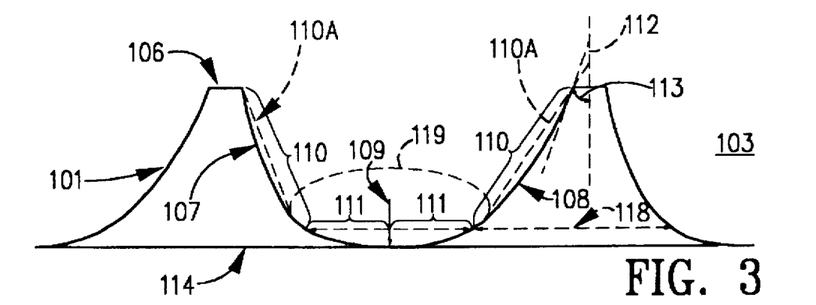
FIG. 3 is an enlarged fragmentary elevational view of a fastener which is provided with a modified thread and can be utilized with advantage as a bone screw.

FIG. 3 illustrates a portion of a modified fastener 101 having a shank provided with a modified external thread 103. All such parts of the thread 103 of FIG. 3 which are identical with or clearly analogous to corresponding parts of the thread 3 shown in FIG. 1 are denoted by similar reference characters plus 100.

The fastener 101 of FIG. 3 can be utilized with advantage as a force transmitting osteosynthetic connector, instrument or accessory, e.g., as a bone screw.

A difference between the first sections 10 shown in FIG. 1 and the first sections 110 of FIG. 3 is that the cross-sections of the sections 110 in a plane including the axis of the thread 103 are concavo-convex curves having concave sides facing the helical groove 104 and having an arcuate shape all the way from the respective second sections 111 to the adjacent portions of the crest 106. Also, the sections 111 of FIG. 3 lack any, or any pronounced, first or radially innermost portions making with an imaginary tangent (114 in FIG. 3) an angle of at least close to 0°. Otherwise stated, the root 109 is not adjacent a truly cylindrical portion of the external surface of the thread 103.

The character 118 denotes in FIG. 3 a line at the periphery of the aforediscussed imaginary cylinder having a diameter corresponding to the pitch diameter of the thread and intersecting the flanks 107, 108 intermediate the respective first and second sections 110, 111 or at least reasonably close to the locations where the radially outermost portions of the second sections 111 merge into the radially innermost portions of the respective first sections 110.

It is within the purview of the invention to impart to the first sections 110 of the flanks 107, 108 a configuration such that the cross-sections of first sections 110 in the plane of FIG. 3 are straight lines. This is indicated in FIG. 3 by broken lines, as at 110A.

The angle 113 which is shown in FIG. 3 is less than 40°, and the composite section including the two first sections 111 (and more particularly a cross-section of such composite section in the plane of FIG. 3) has at least four portions which gradually merge into each other and have different radii of curvature. The cross-sections of both second sections 111 in the plane of FIG. 3 form part, or at least approximate a portion, of an ellipse 119.

The configuration of a curve denoting the cross-section of at least one first and/or second section (such as 110 and/or 111) in the plane including the axis of the respective thread can resemble a cubic parabola or another higher-degree curve which can be arrived at by resorting to the equation $y=x^n$ wherein n is between 1.5 and 5 (e.g., at least close to 3).

The configuration of the sections 110, 111 which form part of the flanks (107, 108) of the thread 103, as well as the configuration of the sections 10, 11 shown in FIG. 1, has been found to greatly reduce the concentration of stresses which develop in standard fasteners in the region of the root and are attributable to the so-called notch effect, in addition, such novel configuration of the sections renders it possible to reduce the depth of the groove 4 or 104, i.e., to increase the minor diameter of the thread 3 or 103. This can be readily noted by referring again to FIG. 1 wherein the cross-sections of the radially innermost portions of the sections 11 in the plane of the axis 5 are straight lines extending in parallelism with the common axis of the thread 3 and the aforementioned imaginary cylinder having a diameter matching the pitch diameter of the thread 3. In other words, it is now possible to increase the diameter of the unthreaded central portion or shank of the threaded fastener. This, too, contributes significantly to the ability of the fastener 1 or 101 to stand pronounced constant or varying tensional stresses.

Figure 4:
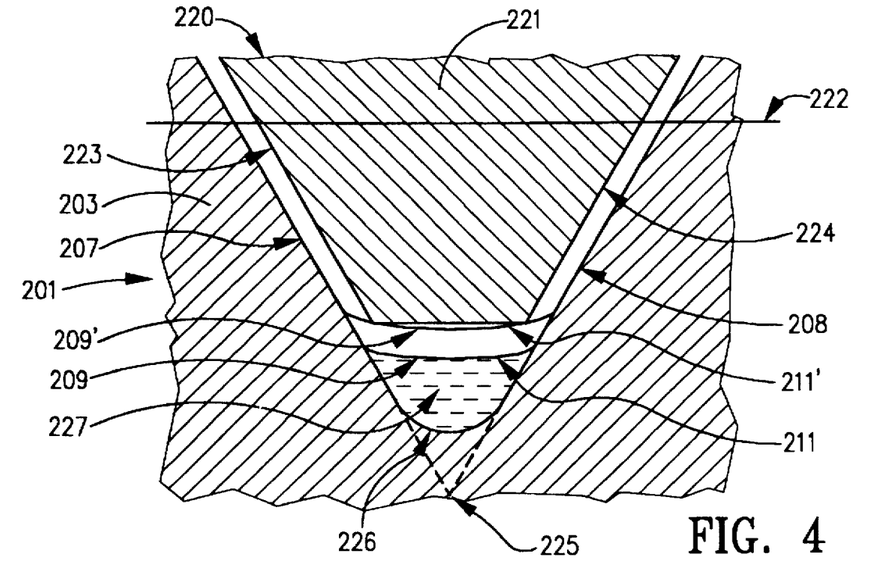
FIG. 4 is a fragmentary axial sectional view of a third fastener and a fragmentary axial sectional view of an internally threaded device mating with the fastener.

FIG. 4 illustrates a portion of a fastener 201 having an external thread 203, and a nut or a sleeve or an analogous part 220 having an internal thread 221 mating with the thread 203. The internal thread 221 resembles an ISO standard metric thread, and the line 222 (which is parallel to the common axis of the threads 203 and 221) denotes a line at the periphery of an imaginary cylinder having a diameter matching or approximating the average diameter of the flanks 223, 224 of the internal thread 221.

The imaginary apex of the thread angle of the thread 203 is shown at 225. Actually, the root of a standard thread is bounded by concave portions 226 of the flanks.

The flanks of the external thread 203 are shown at 207, 208; such flanks are adjacent and substantially parallel to the flanks 223,224 of the internal thread 221 and of the nut 220. The radially inner (second) sections 221 of the flanks 207, 208 forming part of the thread 203 shown in FIG. 4 are shaped by the nut 220, the internal thread 221 of which is configurated in accordance with the present invention. The depth of the groove of the thread 203 can be reduced still further by shifting the portions of the (second) sections 211 further away from the axis of the fastener 201, e.g., all the way to the locations shown at 211'. The combined section including the sections 211 or 211' comprises at least four portions which merge into each other and have different radii of curvature. The root 209 at the junction of the sections 211 is located at a smallest minor diameter, and the root 209' at the largest minor diameter of the thread 203.

The hatched area 227 denotes the difference between the mass of a standard thread and the minimum mass of the thread 203, i.e., the mass of the thread 203 is considerably larger and contributes to the ability of the fastener 201 to stand tensional stresses. In addition, the configuration of the sections 211 or 211' reduces the likelihood of pronounced concentration of stresses at the root 209 or 209' for reasons which were explained with reference to FIGS. 1 to 3.

Figure 5:
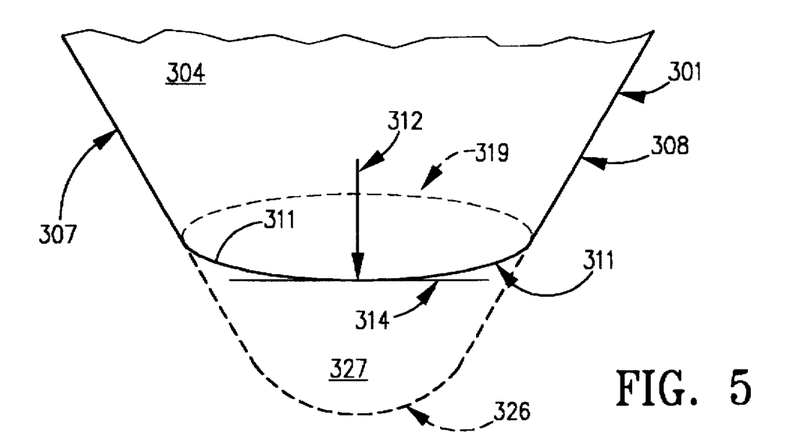
FIG. 5 is an enlarged view of portions of second sections of flanks forming part of the thread of a further fastener.

FIG. 5 shows the manner in which the design of the flanks 307, 308 of the fastener 301 departs from the design of a ISO standard metric thread. Those portions of the flanks of a standard thread which are adjacent the root are indicated in FIG. 5 by a broken line which is a curve 326 having a constant or practically constant radius of curvature. On the other hand, the sections 311 of the flanks 307, 308 of the thread of the fastener 301 resemble neighboring portions of an ellipse 319 having a minor axis in the plane 312 and a major axis parallel to tangent 314, i.e., to the axis of the thread of the fastener 301. The ratio a/b of the major and minor diameters of the ellipse 319 is preferably between 1.5 and 15, most preferably approximately 5.

The area 327 between the sections 311 and the corresponding sections of the curve 326 of FIG. 5 denotes the difference between the mass of the thread forming part of the fastener 301 and the mass of a standard ISO metric thread. It will be seen that the depth of the groove 304 is much less than the depth of the groove in a standard thread. As already pointed out in connection with FIG. 4, this greatly enhances the ability of the improved thread to stand pronounced constant or varying tensional stresses.

The configuration of the flank 7, 107, 207 or 307 can but need not depart from the configuration of the respective flank 8, 108, 208 or 308. Otherwise stated, and referring again to FIG. 1, the configuration of the left-hand section 10 can depart from the configuration of the right-hand section 10 and/or the configuration of the left-hand section 11 can depart from the configuration of the right-hand section. Furthermore, it is clear that the invention can be embodied with equal or embodied with equal or similar advantage in a tool for forming or shaping the thread of a fastener having an internal thread or an internal thread as well as an external thread (see FIG. 8). This holds true for each of the illustrated embodiments. FIG. 1 actually shows that the configuration of the flank 7 is not identical with that of the flank 8. The same applies (or can apply) for the flanks of the thread 103 or 203 and/or for the flanks of the thread forming part of the fastener 301.

If the invention is embodied in a tool for shaping or forming a fastener or accessory or instrument or implement having an internal thread, it is particularly desirable and advantageous to design at least those sections of the flanks which are immediately adjacent the root of the internal thread in a manner as explained with reference to FIGS. 1 to 5, i.e., that a combined section including two second sections have at least four portions with different radii of curvature.

Another feature of the present invention resides in the provision of a method of making threads of the type shown in FIGS. 1, 3, 4 and 5, by removing material from a blank which is to be provided with the novel thread and/or by displacing the material of such blank. All that is necessary is to provide the tool with a profile complementary to that of the thread 3, 103, 203 or the thread of the fastener 301, i.e., with a profile which is complementary to the profile of the desired external or internal thread to be provided in a blank for conversion of such blank into a fastener, a force transmitting member, an accessory or any other component which is to be capable of standing pronounced constant or varying tensional stresses.

The improved method and/or the internally and/or externally profiled tool having one or more profiles configurated in accordance with the present invention is susceptible of many additional modifications. For example, the curvature of one second section (such as the left-hand section 11 or the righthand section 11 of FIG. 1) forming part of the load bearing flank of the thread formed by the novel tool can be even more gradual than the curvature of the other second section. In other words, and as already mentioned hereinbefore, the exact configuration of one of the second sections need not be a mirror image of the configuration of the other second section (e.g., with reference to a plane including the root 9 and being normal to the axis 5). By way of example only, one of the second sections 11 shown in FIG. 1 can form part of a first ellipse, and the other second section 11 can form part of a different second ellipse. The same holds true for the first sections of the flanks, e.g., the first sections 10 of the flanks 7 and 8 shown in FIG. 1. The exact configuration of the left-hand section 10 can depart from the configuration of the right-hand section 10.

A gradual transition from the first sections into the second sections of the flanks forming part of the thread obtainable by resorting to the novel tool is desirable and advantageous because this ensures that the part which is provided with the thread is less likely to break during separation of the fastener from the structure (e.g., an osteosynthetic plate or a bone) which is in mesh with the thread. The configuration of the first sections can be such that the forces acting upon the first sections (e.g., during extraction of a fastener 1 from a plate, a bone or the like) entails the generation of forces acting at least substantially at right angles to the respective portions of the first sections of the flanks. At the same time, the second sections of the flanks should be configurated and dimensioned in such a way that they tend to move the material of the complementary (mating) device in a direction substantially radially of the axis of the thread. This can be readily accomplished by resorting to threads of the type shown in FIGS. 1, 3, 4 and 5. Referring again to FIG. 1, the curvature of each of the flanks 7, 8 first increases in a direction from the root 9 toward the crest 6 to reach a maximum value and thereupon decreases to a minimum value. The intermediate portions of the flanks (such as 7 and 8) having minimal radii of curvature are or can be located close to the aforementioned imaginary cylinder having a diameter which matches the pitch diameter of the thread and an axis which coincides or practically coincides with the axis of the thread. Such configuration is particularly desirable if the fastener is to be driven into ductile or elastically deformable materials including wood, soft metals, bones and certain plastic substances.

The novel profile can be provided on tools for the forming or shaping of threads in or on force transmitting osteosynthetic members of the type disclosed in commonly owned copending patent application Ser. No. 08/342,499 filed Nov. 21, 1994, now U.S. Pat. No. 5,653,499 granted Aug. 5, 1997, to which reference may be had, if necessary.

Figure 6:
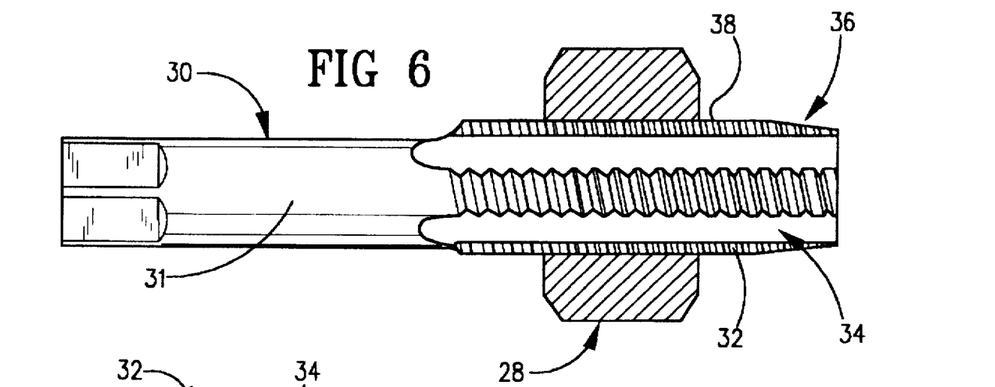
FIG. 6 is an elevational view of a tool which constitutes a tap and is in the process of forming a complementary internal thread in a workpiece which is to be converted into a nut.
Figures 7, 8:
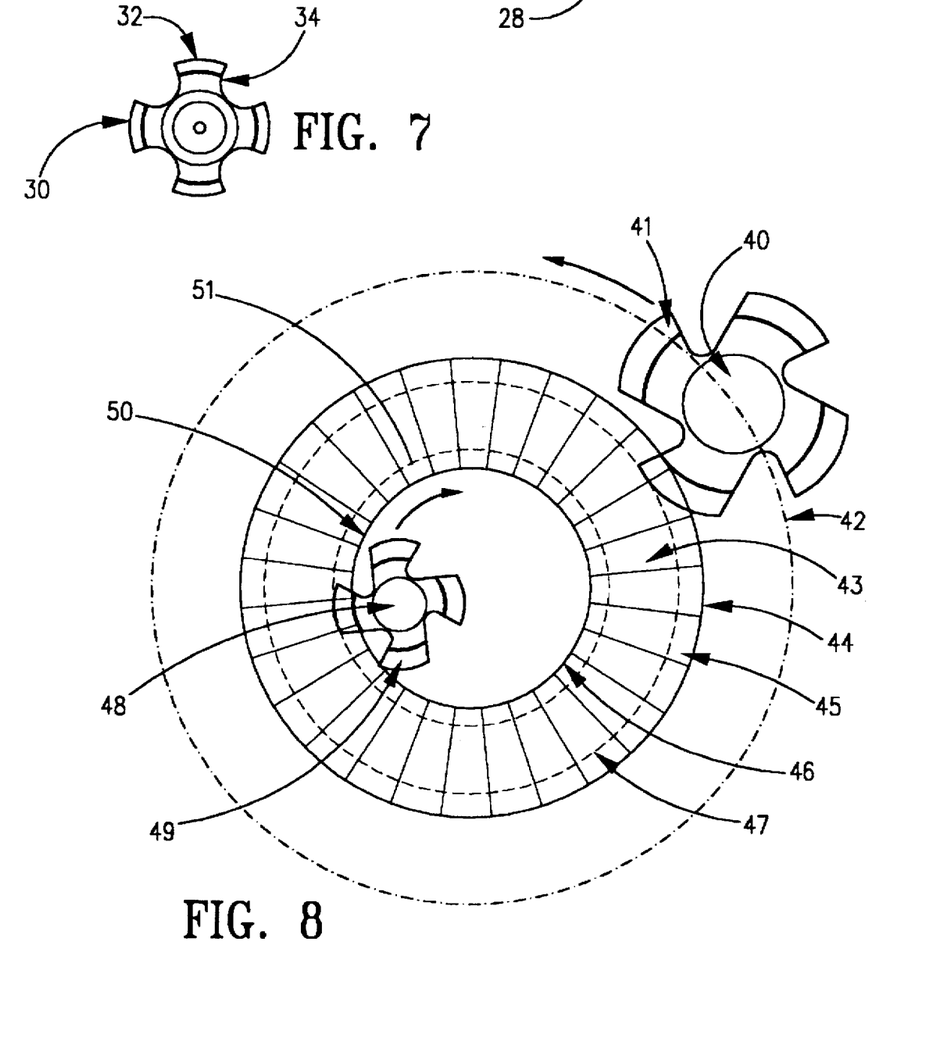
FIG. 7 is an end elevational view of the tap.
FIG. 8 is an end elevational view of a tubular workpiece and of two milling cutters one of which is in the process of providing the workpiece with an external thread and the other of which is in the process of providing the workpiece with an internal thread.

FIGS. 6 and 7 show a tool 30 which is a tap having a shank 31 and serving to form or shape an internal thread in a nut 2a or an analogous hollow fastener. The thread forming or shaping part or profile of the tap 30 is adjacent the shank 31, as seen in the axial direction of the tap, and includes an externally threaded cylindrical portion 38 preceded by a frustoconical portion 36. The external profiles 32 of the portions 36, 38 are threads complementary to the internal thread of the fastener 2a when the forming or shaping of the internal thread in the fastener is completed. The character 34 denotes one of four straight flutes in the peripheries of the externally threaded portions 36 and 38.

FIG. 8 illustrates a tubular workpiece 43 which is being provided with an external thread 45 and an internal thread 46 to be converted into a fastener constituting a tube. The external thread 45 is formed by a first thread milling cutter 40, and the internal thread 46 is being formed by a second thread milling cutter 48. The external profile 41 of the cutter 40 is or can be a thread complementary to the external thread 45 of the workpiece 43, and the external profile 49 of the cutter 48 is or can be a thread complementary to the internal thread 46 of the workpiece. The formation or shaping of the thread 45 takes place while the cutter 40 rotates about its own axis and orbits along a path 42 in a counterclockwise direction, as viewed in FIG. 8. The forming or shaping of the internal thread 46 takes place while the cutter 48 rotates about its own axis and orbits in a clockwise direction, as viewed in FIG. 8.

The crest of the external thread 45 on the workpiece 43 is shown at 44, and the root of such thread is shown at 47. The crest of the internal thread 46 is shown at 50, and the root of the thread 46 is shown at 47.

Figure 9:
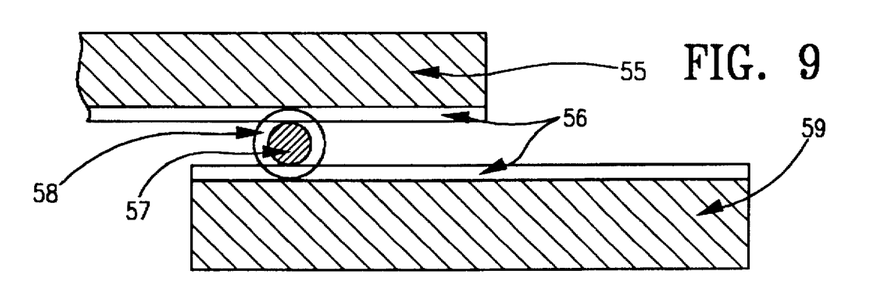
FIG. 9 is a sectional view of the jaws of a thread rolling tool which is in the process of providing a workpiece with an external thread.

FIG. 9 shows two jaws 55, 59 of a thread rolling tool. Such tool is utilized to form an external thread 58 on a fastener 57, e.g., a screw. Reference may be had, for example, to U.S. Pat. No. 4,764,067 granted Aug. 16, 1988 to Kawashima the disclosure of which is incorporated herein by reference. This patent discloses a system for rolling external threads in screws or the like. Save for the novel configuration of the thread forming parts or profiles 56 of the jaws 55, 59 shown in FIG. 9 of the present case, these jaws can be identical with the jaws 34 shown, for example, in FIGS. 17 and 18 of the patent to Kawashima.

Figure 10:
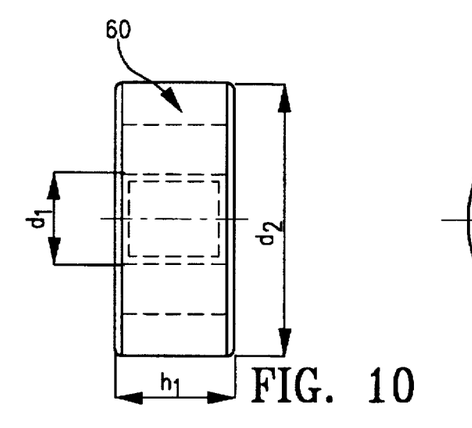
FIG. 10 is a side elevational view of a thread forming die.
Figure 11:
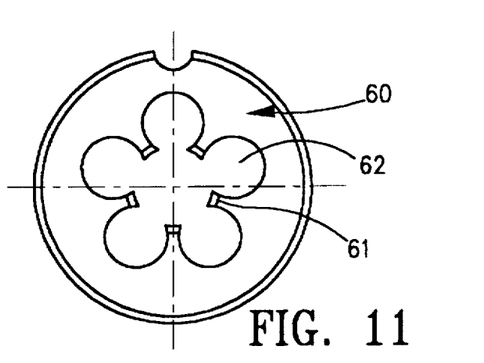
FIG. 11 is an end elevational view of the die which is shown in FIG. 10.

Referring to FIGS. 10 and 11, there is shown a die 60 having an internal profile (e.g., a thread) 61 for the forming of a complementary external thread on a screw or an analogous fastener. The nominal diameter of the external thread to be formed on a workpiece is shown at $d_1$, the character $d_2$ denotes the outer diameter of the die 60, and the height or axial length of the die is shown at $h_1$. The internal surface of the die 60 is provided with axially parallel flutes 62.

Figure 12:
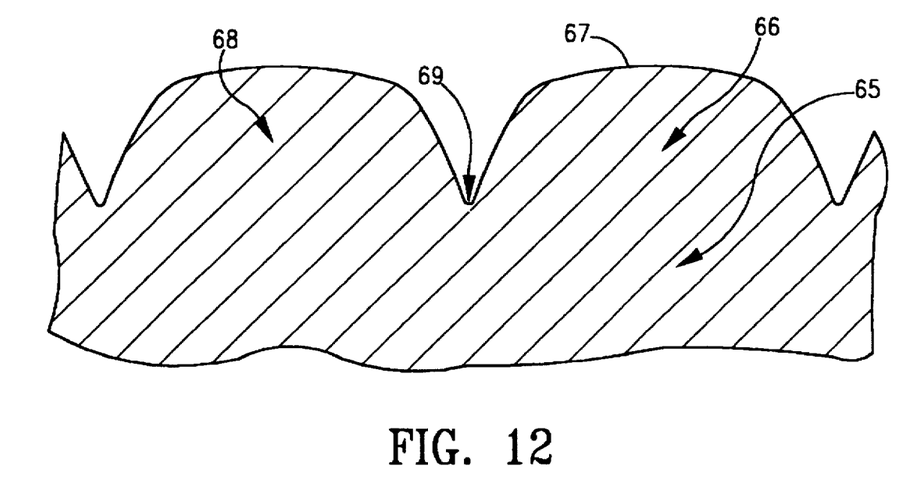
FIG. 12 is an enlarged fragmentary axial sectional view of a tool which embodies the invention and has a profile in the form of a thread.

FIG. 12 is an enlarged fragmentary axial sectional view of a tool which embodies one form of the invention and has a profile in the form of a thread including the convolutions 66, 68 surrounding a shank 65. The character 67 denotes the crest of the convolution 66, and the character 69 denotes the root between the convolutions 66, 68. The thread including the convolutions 66, 68 is complementary to the thread to be formed on a workpiece (see FIG. 1) which is to be converted into a fastener in accordance with the present invention.

If the tool of FIG. 12 is to form external threads, the part 65 constitutes an annular portion surrounding the internal thread of the tool.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of making thread shaping or forming tools and, therefore, such adaptations should and are intended to be comprehended within the meaning and range of equivalence of the appended claims.

What is claimed is:

1. A tool comprising means for providing a fastener with a thread having a longitudinal axis, a pitch diameter, a root, a crest and two flanks each extending between said root and said crest and each having a first section disposed between said crest and an imaginary cylinder having said pitch diameter and an axis at least substantially coinciding with said longitudinal axis, each first section making an angle of less than approximately 40° with a plane which is normal to said longitudinal axis and each of said flanks further having an arcuate second section disposed between said root and said imaginary cylinder, said second sections jointly including at least four portions having different radii of curvature.

2. The tool of claim 1, wherein said second sections of the flanks of the thread formed by said profile jointly include at least five portions having different radii of curvature.

3. The tool of claim 1, wherein one portion of at least one of said second sections of the flanks of the thread formed by said profile is adjacent said root and has a radius of curvature greater than 0.25 h wherein his the pitch of said thread.

4. The tool of claim 1, wherein one portion of the second section of at least one of said flanks of the thread formed by said profile is adjacent said root and has a radius of curvature greater than 0.5 h wherein h is the pitch of said thread.

5. The tool of claim 1, wherein a cross-section of at least one of said sections of the flanks of the thread formed by said profile in a plane including said longitudinal axis is a curve having a plurality of neighboring concave portions each having a different radius of curvature and each merging gradually into the neighboring concave portions.

6. The tool of claim 1, wherein at least one of said second sections of the flanks of the thread formed by said profile includes a first portion disposed at said root and having an infinitely large radius of curvature.

7. The tool of claim 6, wherein a cross-section of said first portion of said at least one second section of each flank of the thread formed by said profile in a plane including said longitudinal axis is at least substantially parallel to said longitudinal axis.

8. The tool of claim 1, wherein the cross-sections of said at least four portions of said second sections of the flanks of the thread formed by said profile in a plane including said longitudinal axis are curves and the tangents to said curves make with said longitudinal axis angles which increase in a direction from said root toward the respective first section.

9. The tool of claim 8, wherein said tangents contact the respective curves at points disposed at different axial distances from said root.

10. The tool of claim 1, wherein said at least four portions of said second sections of the flanks of the thread formed by said profile comprise two series of successive portions each including a first portion at said root and a last portion at the respective first section, the radii of curvature of said successive portions of each of said series increasing in directions from the respective second sections toward said root.

11. The tool of claim 10, wherein the cross-sections of said portions of said second sections in a plane including said longitudinal axis together form a curve and the inclination of imaginary tangents contacting said curve at said portions of said second sections relative to said longitudinal axis increases in a direction from each first portion toward the respective last portion.

12. The tool of claim 11, wherein said inclination is between approximately 0° and 15°.

13. The tool of claim 1, wherein a cross-section of at least one portion of said second sections of the flanks of the thread formed by said profile in a plane including said longitudinal axis constitutes a higher degree curve.

14. The tool of claim 13, wherein said curve resembles or constitutes an intersection of a plane with a cone of revolution.

15. The tool of claim 12, wherein said curve includes a portion of at least one ellipse.

16. The tool of claim 15, wherein said at least one ellipse has a major axis a and a minor axis b and the value of a/b is between about 1.5 and 15.

17. The tool of claim 16, wherein the value of a/b is approximately 3.

18. The tool of claim 1, wherein a cross-section of at least one of said sections of the flanks of the thread formed by said profile in a plane including said longitudinal axis is a curve characterized by at least one equation $y=x^n$ wherein n is between 1.5 and 5.

19. The tool of claim 18, wherein the value of n at least approximates 3.

20. The tool of claim 1, wherein one of said second sections has a first configuration and the other of said second sections has a different second configuration.

21. The tool of claim 1, wherein a cross-section of at least one of said first sections in a plane including said longitudinal axis comprises a concave portion.

22. The tool of claim 21, wherein said concave portion is adjacent said crest and an imaginary tangent to said concave portion makes an angle of less than 71° with a plane which is normal to said longitudinal axis.

23. The tool of claim 1, wherein a cross-section of at least a portion of at least one of said first sections of the flanks of the thread formed by said profile is a plane including said longitudinal axis is a concave curve.

24. The tool of claim 1, wherein one of said first sections of the flanks of the thread formed by said profile has a first configuration and the other of said first sections has a different second configuration.

25. The tool of claim 1, wherein said thread is an external thread.

26. The tool of claim 1, wherein said thread is an internal thread.

27. The tool of claim 1, wherein said fastener constitutes or forms part of an osteosynthetic connector, instrument or accessory.

28. The tool of claim 1, wherein said fastener constitutes or forms part of a screw.

29. The tool of claim 1, wherein said fastener is a nut.

30. The tool of claim 1, wherein said fastener is an insert.

31. The tool of claim 1, wherein said fastener is a tube.

* * * * *